(12) United States Patent
Morino et al.

(10) Patent No.: US 9,266,519 B2
(45) Date of Patent: *Feb. 23, 2016

(54) HYDRAULIC CONTROL DEVICE

(75) Inventors: Takuro Morino, Numazu (JP); Shuji Moriyama, Susono (JP); Yoshio Ito, Susono (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/358,100

(22) PCT Filed: Nov. 22, 2011

(86) PCT No.: PCT/JP2011/076951
§ 371 (c)(1),
(2), (4) Date: May 14, 2014

(87) PCT Pub. No.: WO2013/076825
PCT Pub. Date: May 30, 2013

(65) Prior Publication Data
US 2014/0296032 A1  Oct. 2, 2014

(51) Int. Cl.
F16H 61/00 (2006.01)
B60W 10/02 (2006.01)
B60W 10/06 (2006.01)

(52) U.S. Cl.
CPC ............ B60W 10/02 (2013.01); B60W 10/06 (2013.01); F16H 61/00 (2013.01); *F16H 2061/0034* (2013.01); *Y10T 477/75* (2015.01)

(58) Field of Classification Search
CPC ................... F16H 2061/0034; F16H 61/00
USPC ............................................ 477/151; 475/84
See application file for complete search history.

(56) References Cited

U.S. PATENT DOCUMENTS

| 2,809,536 A | * | 10/1957 | O'Malley ...................... 477/151 |
| 3,004,447 A | * | 10/1961 | Sand ............................ 477/150 |
| 3,886,819 A | | 6/1975 | Lentz |
| 3,908,485 A | | 9/1975 | Miyauchi et al. |
| 4,056,991 A | | 11/1977 | Sakai et al. |

(Continued)

FOREIGN PATENT DOCUMENTS

| DE | 2450584 A1 | 5/1975 |
| JP | 52-014174 A | 2/1977 |

(Continued)

OTHER PUBLICATIONS

Notice of Allowance mailed Mar. 31, 2015 in U.S. Appl. No. 14/239,026.

*Primary Examiner* — Ramya Burgess
*Assistant Examiner* — David Morris
(74) *Attorney, Agent, or Firm* — Kenyon & Kenyon LLP

(57) ABSTRACT

A hydraulic control device includes an accumulator configured to accumulate oil supplied by a mechanical pump and supply the accumulated oil to a C1 control system (clutch) by discharging the accumulated oil; a first oil passage connected to the hydraulic route (clutch oil passage) on an upstream side of a SLC linear solenoid; a second oil passage connected to the hydraulic route on a downstream side of the manual valve; and connection control unit (a switching valve and a pressure accumulation control valve) configured to control the connection between the accumulator and the hydraulic route so that the accumulator is in communication with one of the first oil passage and the second oil passage.

2 Claims, 6 Drawing Sheets

(56) References Cited

U.S. PATENT DOCUMENTS

| | | | |
|---|---|---|---|
| 4,125,038 A | 11/1978 | Hiramatsu | |
| 4,308,765 A | 1/1982 | Iwanaga et al. | |
| 4,324,156 A | 4/1982 | Iwanaga et al. | |
| 4,428,258 A * | 1/1984 | Kubo et al. | 477/151 |
| 6,059,681 A | 5/2000 | Takiguchi | |
| 6,364,802 B1 | 4/2002 | Yi | |
| 8,210,978 B2 | 7/2012 | Shirasaka et al. | |
| 8,444,529 B2 | 5/2013 | Katou | |
| 8,986,164 B2 | 3/2015 | Morino et al. | |
| 2010/0167874 A1 | 7/2010 | Shirasaka et al. | |
| 2014/0315687 A1 | 10/2014 | Morino et al. | |

FOREIGN PATENT DOCUMENTS

| | | |
|---|---|---|
| JP | 11210876 A | 8/1999 |
| JP | 2001-082592 A | 3/2001 |
| JP | 2001-082596 A | 3/2001 |
| JP | 2002-115755 A | 4/2002 |
| JP | 2002-130449 A | 5/2002 |
| JP | 2008-215592 A | 9/2008 |
| JP | 2010-151226 A | 7/2010 |
| JP | 2011-231818 A | 11/2011 |
| WO | 2010-021218 A1 | 2/2010 |
| WO | 2013076825 A1 | 5/2013 |

* cited by examiner

HYDRAULIC CONTROL DEVICE

CROSS-REFERENCE TO RELATED APPLICATIONS

This is a national phase application based on the PCT International Patent Application No. PCT/JP2011/076951 filed Nov. 22, 2011, the entire contents of which are incorporated herein by reference.

FIELD

The present invention relates to a hydraulic control device.

BACKGROUND

Conventionally, vehicles capable of executing an idling stop function of performing a stop of an engine and a release of a clutch while traveling of the vehicle have been known. In such vehicles, when the engine stops during execution of the idling stop function, a hydraulic pressure for operating a drive system of a clutch may be insufficient in some cases. Thus, a configuration provided with an accumulator capable of performing pressure accumulation and discharge of hydraulic pressure to compensate for the insufficiency of the hydraulic pressure has been known (for example, Patent Literatures 1 and 2). Furthermore, Patent Literature 1 discloses a configuration provided with a first accumulator for supplying the hydraulic pressure to the drive system of the clutch at the time of restarting an engine when returning from the idling stop control, and a second accumulator for reducing an engagement shock of the clutch.

CITATION LIST

Patent Literature

Patent Literature 1: Japanese Patent Application Laid-open No. 2002-115755
Patent Literature 2: Japanese Patent Application Laid-open No. 2010-151226

SUMMARY

Technical Problem

As in the configuration described in Patent Literature 1, when configured to have the configuration provided with the two accumulators for a hydraulic pressure supply at the time of restarting the engine and for an engagement shock reduction, the number of components increases, and the configuration becomes complicated.

The present invention has been made in view of the above, and an object of the present invention is to provide a hydraulic control device capable of concurrently achieving the supply of hydraulic pressure to the clutch at the time of restarting the engine and the engagement shock reduction of the clutch by a simple structure.

In order to achieve the above mentioned object, a hydraulic control device according to the present invention of a vehicle including a mechanical pump configured to discharge oil by driving of an engine, a hydraulic route configured to supply the oil discharged by the mechanical pump to a clutch, a clutch pressure control valve provided on the hydraulic route and configured to control a clutch pressure serving as a hydraulic pressure supplied to the clutch, and a manual valve provided on a downstream side of the clutch pressure control valve of the hydraulic route and configured to switch a hydraulic pressure supply to the clutch depending on a shift operation of the vehicle, the hydraulic control device includes an accumulator configured to accumulate the oil supplied by the mechanical pump and supply the accumulated oil to the clutch by discharging the accumulated oil; a first oil passage connected to the hydraulic route on an upstream side of the clutch pressure control valve; a second oil passage connected to the hydraulic route on a downstream side of the manual valve; and a connection control means configured to control the connection between the accumulator and the hydraulic route so that the accumulator is in communication with one of the first oil passage and the second oil passage.

Further, in the hydraulic control device, it is preferable that the connection control means includes a switching valve configured to switch so that the accumulator is in communication with the hydraulic route via the first oil passage during stop of the engine, and to switch so that the accumulator is in communication with the hydraulic route via the second oil passage during operation of the engine, and a pressure accumulation control valve disposed between the switching valve and the accumulator and configured to control the pressure accumulation and discharge of the accumulator.

Advantageous Effects of Invention

In the hydraulic control device according to the present invention, it is possible to properly use a single accumulator as both of a function (a pressure accumulation/discharge function) for supplying the hydraulic pressure to the clutch at the time of restarting the engine, and a function (a damper function) for reducing the clutch engagement shock, depending on whether the accumulator is connected to a hydraulic route via one of a first oil passage or a second oil passage. As a result, there is an effect in that these functions can be achieved with a simple configuration.

DESCRIPTION OF EMBODIMENTS

Figure 1:
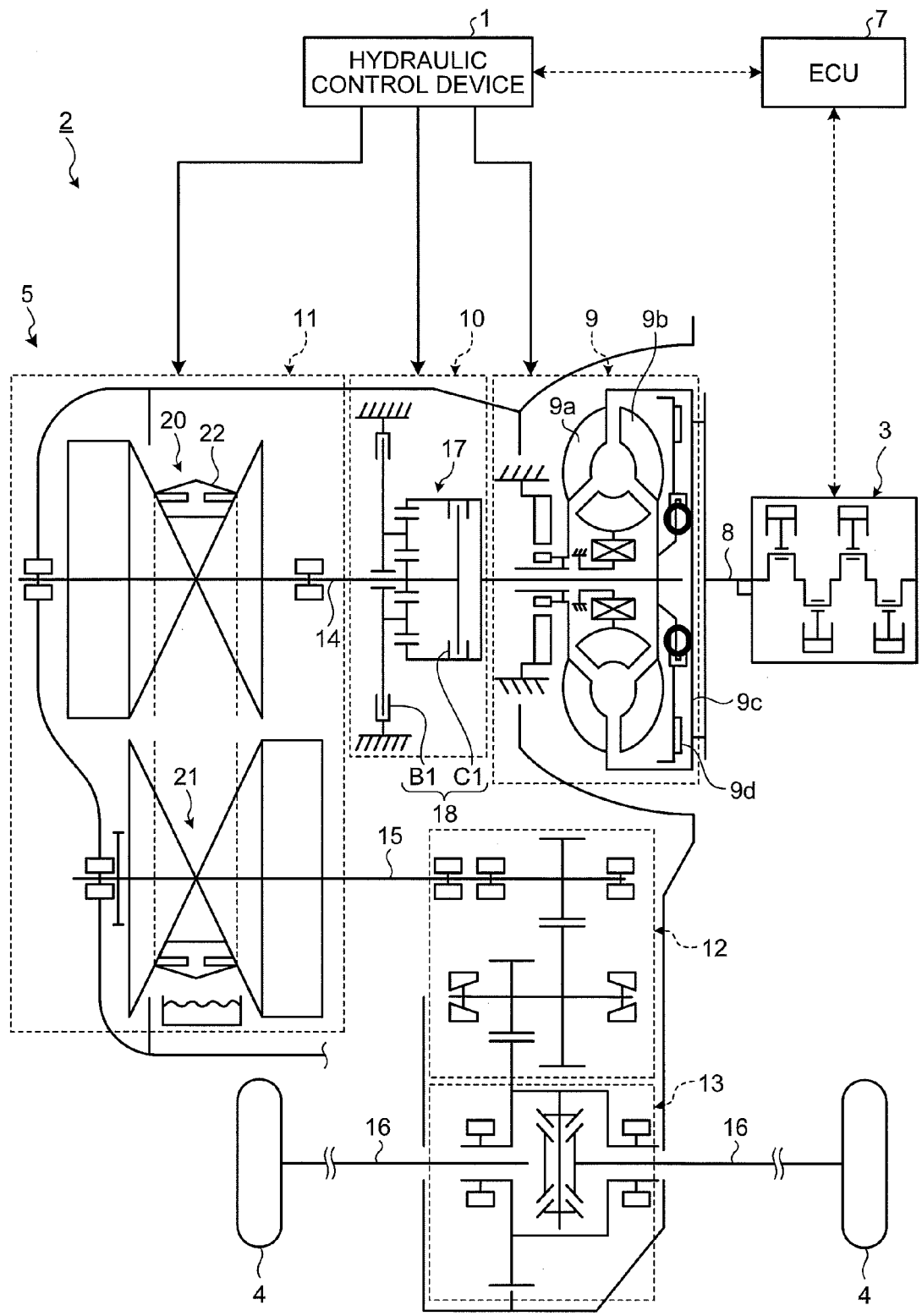
FIG. 1 is a schematic diagram illustrating a configuration of a vehicle equipped with a hydraulic control device according to an embodiment of the present invention.

Embodiments of the hydraulic control device according to the present invention will be described hereinafter with reference to the drawings. In the following drawings, the same or corresponding parts are denoted by the same reference numerals, and the description thereof is not repeated.

First, a configuration of a vehicle 2 equipped with a hydraulic control device 1 according to the embodiment will be described with reference to FIG. 1. As illustrated in FIG. 1, the vehicle 2 is provided with an engine 3 as a power source while traveling, driving wheels 4, a power transmission device 5, a hydraulic control device 1, and an electronic control unit (ECU) 7.

The engine 3 is a traveling drive source (a motor) configured to drive the vehicle 2, and generates power to be applied to the driving wheels 4 of the vehicle 2 by consuming fuel. The engine 3 is able to generate mechanical power (engine torque) in a crankshaft 8 serving as an engine output shaft with combustion of the fuel and output the mechanical power toward the driving wheels 4 from the crankshaft 8.

The power transmission device 5 transmits the power to the driving wheels 4 from the engine 3. The power transmission device 5 is provided in a transmission route of power from the engine 3 to the driving wheels 4, and is operated by pressure of oil (oil pressure) as a liquid medium.

More specifically, the power transmission device 5 is configured to include a torque converter 9, a forward-reverse switching mechanism 10, a continuously variable transmission mechanism 11, a speed reduction mechanism 12, a differential gear 13 and the like. The power transmission device 5 is configured so that the crankshaft 8 of the engine 3 and an input shaft 14 of the continuously variable transmission mechanism 11 are connected to each other via the torque converter 9, the forward-reverse switching mechanism 10 and the like, and an output shaft 15 of the continuously variable transmission mechanism 11 is connected to the driving wheels 4 via the speed reduction mechanism 12, the differential gear 13, a driving shaft 16 and the like.

The torque converter 9 is disposed between the engine 3 and the forward-reverse switching mechanism 10, and is able to amplify (or maintain) torque of the power transmitted from the engine 3 and transmit the amplified torque to the forward-reverse switching mechanism 10. The torque converter 9 is provided with a pump impeller 9a and a turbine runner 9b disposed to face each other in a freely rotatable manner, and is configured so that the pump impeller 9a is coupled to the crankshaft 8 via a front cover 9c in an integrally rotatable manner and the turbine runner 9b is connected to the forward-reverse switching mechanism 10. Moreover, according to the rotation of the pump impeller 9a and the turbine runner 9b, as viscous fluid such as hydraulic oil interposed between the pump impeller 9a and the turbine runner 9b is circulated, it is possible to amplify and transmit the torque while permitting a differential between the input and output thereof.

Furthermore, the torque converter 9 is further provided with a lock-up clutch 9d that is provided between the turbine runner 9b and the front cover 9c and is connected to the turbine runner 9b in an integrally rotatable manner. The lock-up clutch 9d is operated by the pressure of oil supplied from the hydraulic control device 1 to be described later and is switched into an engaged state (lock-up ON) with the front cover 9c and a released state (lock-up OFF). In a state in which the lock-up clutch 9d is engaged with the front cover 9c, the front cover 9c (i.e., the pump impeller 9a) is engaged with the turbine runner 9b, a relative rotation between the pump impeller 9a and the turbine runner 9b is restricted, and the differential between input and output is prohibited. Accordingly, the torque converter 9 transmits the torque transmitted from the engine 3 to the forward-reverse switching mechanism 10 as it is.

The forward-reverse switching mechanism 10 is able to shift power (rotational output) from the engine 3 and switch a rotation direction thereof. The forward-reverse switching mechanism 10 is configured to include a planetary gear mechanism 17, a forward-reverse switching clutch (forward clutch) C1 as a frictional engagement element, a forward-reverse switching brake (reverse brake) B1 and the like. The planetary gear mechanism 17 is a differential mechanism including a sun gear, a ring gear, a carrier and the like as a plurality of rotational elements capable of mutually differentially rotating. The forward-reverse switching clutch C1 and the forward-reverse switching brake B1 are engagement elements for switching the operating state of the planetary gear mechanism 17 and can be constituted, for example, by a friction type engagement mechanism such as a multi-plate clutch. A hydraulic wet multi-plate clutch is used as these elements here.

In the forward-reverse switching mechanism 10, the forward-reverse switching clutch C1 and the forward-reverse switching brake B1 are operated by the pressure of oil supplied from the hydraulic control device 1 to be described later, and the operating state is switched. When the forward-reverse switching clutch C1 is in the engaged state (ON state) and the forward-reverse switching brake B1 is in the released state (OFF state), the forward-reverse switching mechanism 10 transmits the power from the engine 3 to the input shaft 14 by a normal rotation (a rotation direction of the input shaft 14 when the vehicle 2 moves forward). When the forward-reverse switching clutch C1 is in the released state and the forward-reverse switching brake B1 is in the engaged state, the forward-reverse switching mechanism 10 transmits the power from the engine 3 to the input shaft 14 by a reverse rotation (a rotation direction of the input shaft 14 when the vehicle 2 moves backward). In a neutral state, the forward-reverse switching mechanism 10 is in the released state together with the forward-reverse switching clutch C1 and the forward-reverse switching brake B1. In this embodiment, the forward-reverse switching clutch C1 and the forward-reverse switching brake B1 are also collectively referred to as a "C1 clutch", and a control system configured to perform the control of engagement/release of the C1 clutch is referred to as a "C1 control system" 18.

The continuously variable transmission mechanism 11 is a transmission that is provided between the forward-reverse switching mechanism 10 and the driving wheels 4 in the transmission route from the engine 3 to the driving wheels 4 and is able to shift and output the power of the engine 3. The continuously variable transmission mechanism 11 is operated by the pressure of oil supplied from the hydraulic control device 1 to be described later.

The continuously variable transmission mechanism 11 is, for example, a known belt type continuously variable automatic transmission (continuously variable transmission: CVT). The continuously variable transmission mechanism 11 has a primary pulley 20 provided on the engine 3 side, a secondary pulley 21 provided on the driving wheel 4 side, and a belt 22. The primary pulley 20 is connected to the input shaft 14. The secondary pulley 21 is connected to the output shaft 15. The belt 22 is stretched between the primary pulley 20 and the secondary pulley 21. The continuously variable transmission mechanism 11 is able to operate a primary pulley side actuator and a secondary pulley side actuator by the pressure of oil supplied from the hydraulic control device 1 to be described later, and continuously change a transmission ratio by changing a pulley ratio. Similarly, it is possible to control a belt clamping force.

The speed reduction mechanism 12 reduces the rotational speed of the power from the continuously variable transmission mechanism 11 and transmits the reduced rotational speed to the differential gear 13. The differential gear 13 transmits the power from the speed reduction mechanism 12 to the respective driving wheels 4 via each driving shaft 16. The differential gear 13 absorbs a difference in rotational speed between center sides of turning generated when the vehicle 2 turns, that is, the inner driving wheel 4 and the outer driving wheel 4.

The power transmission device 5 configured as described above is able to transmit the power generated by the engine 3 to the driving wheels 4, via the torque converter 9, the forward-reverse switching mechanism 10, the continuously variable transmission mechanism 11, the speed reduction mechanism 12, the differential gear 13 and the like. As a result, a driving force [N] is generated on a ground plane between the vehicle 2 and the road surface of the driving wheels 4, and thus the vehicle 2 is capable of traveling.

The hydraulic control device 1 operates the power transmission device 5 that includes the lock-up clutch 9d of the torque converter 9, the forward-reverse switching clutch C1 and the forward-reverse switching brake B1 of the forward-reverse switching mechanism 10, the primary pulley 20 and the secondary pulley 21 of the continuously variable transmission mechanism 11 and the like, by the hydraulic pressure of oil as a fluid. The hydraulic control device 1 is configured to include, for example, various hydraulic control circuits controlled by the ECU 7. The hydraulic control device 1 is configured to include a plurality of oil passages, an oil reservoir, an oil pump, a plurality of electromagnetic valves and the like, and controls a flow rate or an hydraulic pressure of oil supplied to each part of the power transmission device 5 depending on the signal from the ECU 7 to be described later. In addition, the hydraulic control device 1 also functions as a lubricating oil supply device configured to perform lubrication of a predetermined position of the power transmission device 5. In addition, the configuration of the hydraulic control device 1 will be described later in details with reference to FIG. 2.

The ECU 7 controls driving of each part of the vehicle 2. The ECU 7 is an electronic circuit that is physically mainly based on a well-known microcomputer including a central processing unit (CPU), a random access memory (RAM), a read only memory (ROM), and an interface. By loading an application program stored in the ROM to the RAM so as to be executed by the CPU, the function of the ECU 7 can be achieved by operating the various devices in the vehicle 2 under the control of the CPU, and by reading and wiring the data in the RAM and the ROM. In this embodiment, by controlling the above-described hydraulic control device 1, the ECU 7 controls each part of the power transmission device 5, such as the torque converter 9, the forward-reverse switching mechanism 10, and the continuously variable transmission mechanism 11. In addition, the ECU 7 is also provided with various other functions used for various controls of the vehicle 2 without being limited to the above-described functions.

Furthermore, the ECU 7 may be configured to include a plurality of ECUs, such as the engine ECU configured to control the engine 3, a T/M ECU configured to control the power transmission device 5 (hydraulic control device 1), and a S&S ECU for executing idling stop (S&S (start and stop)) control.

In addition, various sensors in the vehicle 2 (not illustrated in FIG. 1) are connected to the ECU 7, the detection signals from various sensors are input thereto, and thus, it is possible to control driving of each part of the vehicle 2, based on these detection signals. Especially, the vehicle 2 of this embodiment is provided with a function of performing the stop of the engine 3 and the release of the C1 clutch while stop or traveling of the vehicle 2 to improve the fuel economy or the like, so-called idling stop control (also referred to as "S&S control" in this embodiment). The ECU 7 is able to execute the idling stop control based on the information of various sensors, when satisfying the predetermined conditions.

Next, a configuration of the hydraulic control device 1 according to this embodiment will be described with reference to FIG. 2.

Figure 2:
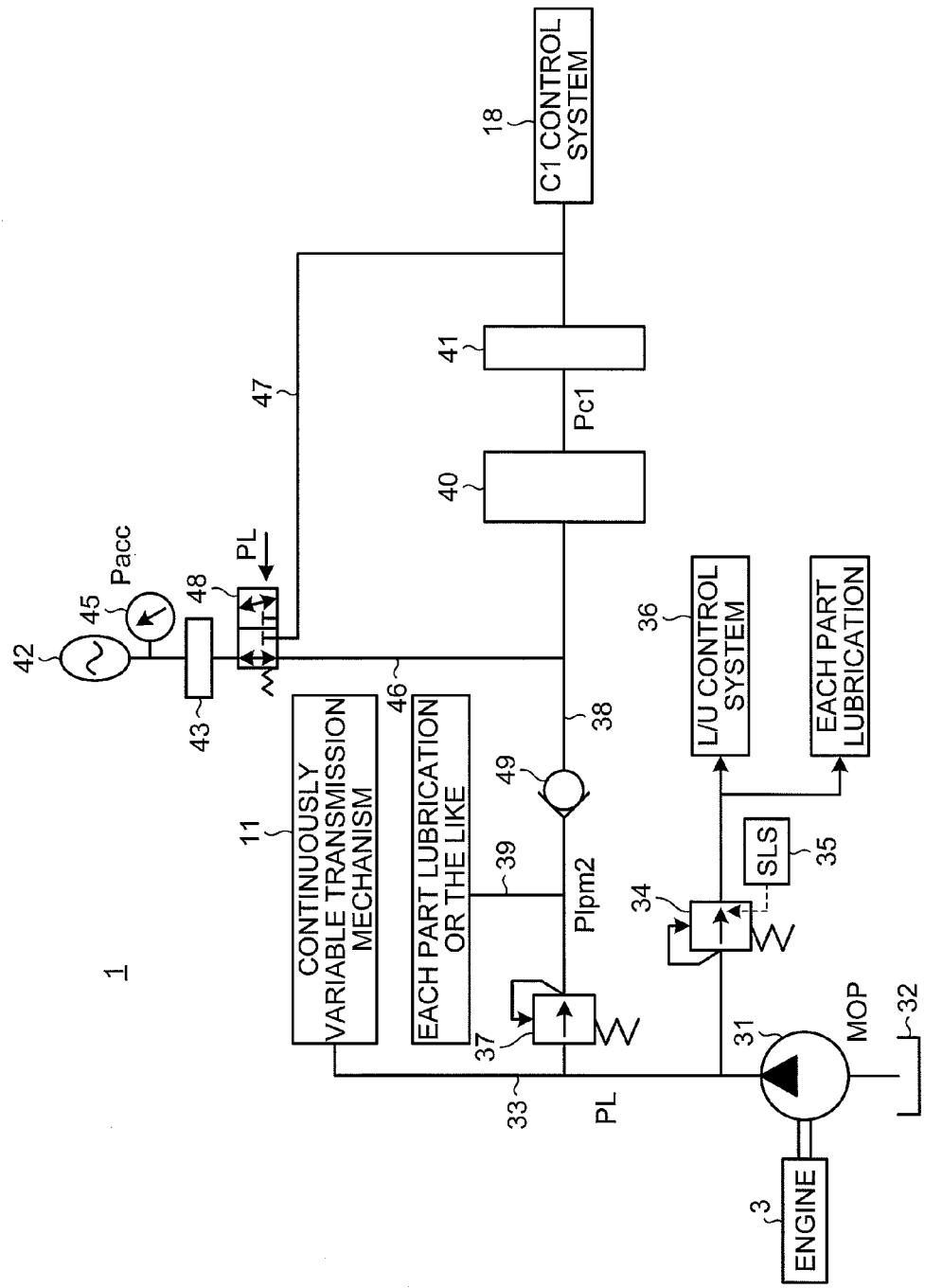
FIG. 2 is a diagram illustrating a schematic configuration of the hydraulic control device of FIG. 1.

As illustrated in FIG. 2, the hydraulic control device 1 is provided with a mechanical machine pump (mechanical pump) 31 driven by driving of the engine 3, as an oil supply source that supplies oil to each part of the power transmission device 5. The mechanical pump 31 discharges the oil stored in a drain 32 in the hydraulic control device 1 by sucking and compressing the oil. The mechanical pump 31 is able to supply the discharged oil to the power transmission device 5 via a hydraulic route 33.

A primary regulator valve 34 is provided in the hydraulic route 33. The primary regulator valve 34 adjusts the hydraulic pressure generated by the mechanical pump 31. The control pressure is supplied to the primary regulator valve 34 by a SLS linear solenoid 35, and the primary regulator valve 34 adjusts the hydraulic pressure in the hydraulic route 33 depending on the control pressure. Moreover, the hydraulic pressure in the hydraulic route 33 adjusted by the primary regulator valve 34 is used as a line pressure PL.

The primary regulator valve 34 can be configured so that, for example, it is possible to apply a spool valve in which a valve member (spool) slides in a valve body in an axial direction to perform opening and closing or switching of the flow passage, the hydraulic route 33 is connected to an input port, the SLS linear solenoid 35 is connected to a pilot port configured to input a pilot pressure, and the control pressure is input thereto, and an excessive flow generated by adjustment of the line pressure PL is discharged from the output port.

An L/U control system 36 configured to control engagement/release of the lock-up clutch 9d of the torque converter 9 is connected to the output port of the primary regulator valve 34, and when the excessive flow is generated from the primary regulator valve 34, the excessive flow is supplied to the L/U control system 36 (or a low-pressure control system capable of being controlled at a lower pressure than the continuously variable transmission mechanism 11). Furthermore, the excessive flow from the primary regulator valve 34 can be supplied to lubrication or the like of each unit of a predetermined position in the power transmission device 5. Although not illustrated in FIG. 2, in the excessive flow supplied to the lubrication or the like of the L/U control system 36 or each unit, an oil passage is formed so as to be finally returned to the drain 32.

The mechanical pump 31 is connected to the C1 control system 18 (the forward-reverse switching clutch C1 and the forward-reverse switching brake B1) of the forward-reverse switching mechanism 10 and the continuously variable transmission mechanism 11 via the hydraulic route 33 so as to be able to supply the hydraulic pressure adjusted to the line pressure PL by the primary regulator valve 34.

In the hydraulic route 33, on a clutch oil passage 38 connected to the C1 control system 18, an LPM No. 2 valve 37 is provided. The LPM No. 2 valve 37 is, for example, a spool valve similar to the primary regulator valve 34, and outputs a predetermined hydraulic pressure Plpm2 obtained by adjusting (decompressing) the line pressure PL introduced into the valve as an original pressure. Furthermore, a lubricating oil passage 39 for supplying the oil of the hydraulic pressure Plpm2 to lubrication or the like of each part of a predetermined position in the power transmission device 5 is connected to the clutch oil passage 38 on the downstream side of the LPM No. 2 valve 37.

A SLC linear solenoid 40 (clutch pressure control valve) is provided on the clutch oil passage 38 on the downstream side of a branch to the lubricating oil passage 39. Similarly to the SLS linear solenoid 35 or the like, the SLC linear solenoid 40 is an electromagnetic valve that generates a control pressure, depending on a current value determined by a duty signal (duty value) transmitted from the ECU 7. In this embodiment, the SLC linear solenoid 40 controls the control pressure (clutch pressure) Pc1 supplied to the C1 control system 18 using the hydraulic pressure Plpm2 as the original pressure.

A manual valve 41 is provided on the downstream side of the SLC linear solenoid 40 in the clutch oil passage 38. The manual valve 41 switches the oil passages in conjunction with a shift operation by a driver of the vehicle 2. For example, when a shift position is "D (forward)", the manual valve 41 is able to connect the oil passage to the forward-reverse switching clutch C1 of the C1 control system 18, thereby controlling the forward-reverse switching clutch C1. In the case of "R (reverse)", the manual valve 41 is able to connect the oil passage to the forward-reverse switching brake B1 of the C1 control system 18, thereby controlling the forward-reverse switching brake B1. When the shift position is "N (neutral)", the manual valve 41 connects the oil passage to neither of the forward-reverse switching clutch C1 and the forward-reverse switching brake B1.

An accumulator 42 is connected to the clutch oil passage 38. The accumulator 42 is configured to be able to store and maintain (accumulate) the hydraulic pressure supplied from the mechanical pump 31 therein when driving the mechanical pump 31 and to supply the maintained hydraulic pressure to the C1 control system 18 as needed.

The accumulator 42 can be achieved by a known configuration, but for example, in the case of a gas type accumulator, a piston is disposed therein, and a gas is filled in an internal space sealed by the piston. At the time of pressure accumulation, the piston is pushed and oil is accumulated therein. At this time, the gas is compressed, and the pressure of a compressed gas is balanced with the pressure of the accumulated oil. Furthermore, at the time of discharge, by extruding the piston using an expansion force of the gas, the accumulated oil is discharged from the interior and supplied to the C1 control system 18.

The accumulator 42 can vary a volume of gas therein depending on sliding of the piston between a minimum value Va_min and a maximum value Va_max, and is configured so that, when the gas volume is the minimum value Va_min, the pressure of gas becomes a maximum value Pa_max, and when the gas volume is the maximum value Va_max, the pressure of gas becomes a minimum value Pa_min. Here, the minimum value Pa_min of the gas pressure corresponds to a packing pressure (an oil pressure capable of filling a clutch pack (a hydraulic oil chamber of the forward-reverse switching clutch C1) with the hydraulic oil so that the clutch plate of the forward-reverse switching clutch C1 comes into contact with (is blocked by) a frictional member). Furthermore, the maximum value Pa_max of the gas pressure is set in advance as a pressure that can maintain the clutch pressure Pc1 at least at Pa_min (packing pressure) at the time of discharge of the pressure accumulation from the accumulator 42.

The pressure accumulation and the discharge of the accumulator 42 are controlled by a pressure accumulation control valve 43 provided between the accumulator 42 and the clutch oil passage 38. The oil is accumulated in the interior of the accumulator 42 by closing the pressure accumulation control valve 43, and the accumulated oil is discharged by opening the pressure accumulation control valve 43. Opening and closing operation of the pressure accumulation control valve 43 is controlled by the ECU 7. The pressure accumulation control valve 43 is, for example, an electromagnetic poppet valve, and opening and closing thereof is switched by adjusting the current supplied by the ECU 7. The pressure accumulation control valve may be, for example, a normally closed type valve that is opened when the current is supplied, and is always closed when there is no current supply. In addition, the pressure accumulation control valve 43 may use other valve structures, such as a spool valve.

Between the accumulator 42 and the pressure accumulation control valve 43, a pressure sensor 45 configured to detect the pressure (accumulator pressure) Pacc of oil accumulated in the accumulator 42 is provided and configured to transmit information about the detected accumulator pressure Pacc to the ECU 7.

Moreover, especially, in this embodiment, the accumulator 42 and the pressure accumulation control valve 43 are connected to the hydraulic route 33 (clutch oil passage 38) by the two oil passages of a first oil passage 46 and a second oil passage 47 in a communicable manner.

A connection position of the first oil passage 46 to the hydraulic route 33 is the upstream side of the SLC linear solenoid 40, preferably, the downstream side of the LPM No. 2 valve 37, and more preferably, the downstream side of the branch to the lubricating oil passage 39 of the clutch oil passage 38 of the hydraulic route 33. A connection position of the second oil passage 47 to the hydraulic route 33 is the downstream side of the manual valve 41.

Furthermore, end portions of the first oil passage 46 and the second oil passage 47 of a side opposite to the side connected to the hydraulic route 33 are connected to a switching valve 48. The switching valve 48 is configured to be also connected to the accumulator 42 and to be able to allow the accumulator 42 and the hydraulic route 33 (clutch oil passage 38) to communicate with each other, by selecting one of the first oil passage 46 or the second oil passage 47.

The switching valve 48 is able to switch the selected oil passage by the line pressure PL generated by driving of the engine 3. More specifically, when the mechanical pump 31 is driven during driving of the engine 3 and the line pressure PL of the predetermined level or more is generated, the switching valve 48 switches the accumulator 42 so as to be communicable with the hydraulic route 33 (the clutch oil passage 38) via the second oil passage 47 (the switching valve 48 moves to the left side by PL in the configuration illustrated in FIG. 2). Meanwhile, when the driving of the mechanical pump 31 also stops during the stop of the engine 3 and the line pressure PL is reduced below a predetermined value, the switching valve 48 switches the accumulator 42 so as to be communicable with the hydraulic route 33 (the clutch oil passage 38) via the first oil passage 46 (the switching valve 48 moves to the right side by a spring in the configuration illustrated in FIG. 2).

In this embodiment, while normal traveling of the vehicle, that is, in a state in which the engine 3 is driven and the mechanical pump 31 discharges the oil of the line pressure PL, the switching valve 48 is switched so as to communicate with the second oil passage 47 by the configuration of the switching valve 48, the first oil passage 46, and the second oil passage 47. At this time, the accumulator 42 is connected to the hydraulic route 33 on the downstream side of the manual valve 41 via the second oil passage 47. Moreover, in this state, by appropriately opening the pressure accumulation control valve 43 and thereafter closing the pressure accumulation control valve 43, it is possible to perform a pressure accumulation process which accumulates the oil to the accumulator 42.

Here, the vehicle 2 of this embodiment is configured to be able to execute the idling stop control as described above, and especially when predetermined conditions are satisfied while traveling of the vehicle 2, such as while deceleration traveling, it is possible to execute the idling stop traveling that travels in a state of performing the stop of the engine 3 and the release of the C1 clutch. During execution of such an idling stop traveling, since the engine 3 stops and the mechanical pump does not output oil of the line pressure PL, in this embodiment, the switching valve 48 is switched so as to communicate with the first oil passage 46. At this time, the accumulator 42 is connected to the hydraulic route 33 on the upstream side of the SLC linear solenoid 40 via the first oil passage 46.

In this state, since the mechanical pump 31 does not discharge the oil, there is a risk in that the line pressure PL of the hydraulic route 33 drops and it is not possible to output the clutch pressure which is large enough to control the C1 control system 18. Meanwhile, when the vehicle returns from the idling stop traveling and an engine recovery request is made, in order to quickly restart the engine 3 and enhance responsiveness of the C1 control system 18, it is desirable that the hydraulic pressure supplied to the C1 control system 18 can be increased to the packing pressure, thereby controlling the C1 control system 18 to be a state just before the forward-reverse switching clutch C1 is engaged.

Therefore, in this embodiment, at the time of return from the idling stop control performed while stop or traveling of the vehicle, by opening the pressure accumulation control valve 43 at the appropriate timing in the state in which the switching valve 48 communicates with the first oil passage 46 as described above, it is possible to perform the discharge process of discharging the oil accumulated in the accumulator 42. At this time, the oil accumulated in the accumulator 42 is discharged to the hydraulic route 33 on the upstream side of the SLC linear solenoid 40 via the first oil passage 46. Thus, since the original pressure Plpm2 for generating the clutch pressure Pc1 is increased by the SLC linear solenoid 40, it is possible to set the clutch pressure Pc1 to the packing pressure by appropriately controlling the SLC linear solenoid 40.

Furthermore, a check valve 49 is provided on the upstream side (a downstream position of the lubricating oil passage 39 in the example of FIG. 2) of the connection position of the first oil passage 46 on the clutch oil passage 38. Accordingly, during the discharge process of the accumulator 42, it is possible to prevent leakage or backflow to the upstream side of the oil discharged from the accumulator 42, thereby efficiently performing an increase of the hydraulic pressure Plpm2 by the accumulator 42.

Here, when the shift operation is performed by the driver while traveling of the vehicle, the manual valve 41 is displaced depending on the shift position. In some cases, there is a situation in which the state of communicating/shutting off the flow of oil in the clutch oil passage 38 is switched by the displacement of the manual valve 41. If this situation occurs, the clutch pressure Pc1 supplied to the C1 control system 18 varies, and there is a possibility that a failure occurs in the control of the clutch C1, such as occurrence of shock during engagement of the C1 clutch (also referred to as "D-N shock" in this embodiment).

Therefore, in this embodiment, while normal traveling of the vehicle, in the state in which the accumulator 42 is in communication with the hydraulic route 33 on the downstream side of the manual valve 41 via the second oil passage 47, when predetermined conditions (the details will be described later with reference to FIG. 5) are satisfied, the pressure accumulation control valve 43 is opened. Thus, the accumulator 42 can be used as a damper function, the variation of the clutch pressure Pc1 due to the displacement of the manual valve 41 can be absorbed by the accumulator 42, and it is possible to stably maintain the clutch pressure Pc1.

In this embodiment, the switching valve 48 and the pressure accumulation control valve 43 are intended to function as "connection control means" that connect the accumulator 42 to one of the first oil passage 46 and the second oil passage 47 in a communicable manner and control the connection between the accumulator 42 and the hydraulic route 33 (the clutch oil passage 38).

Figure 3:
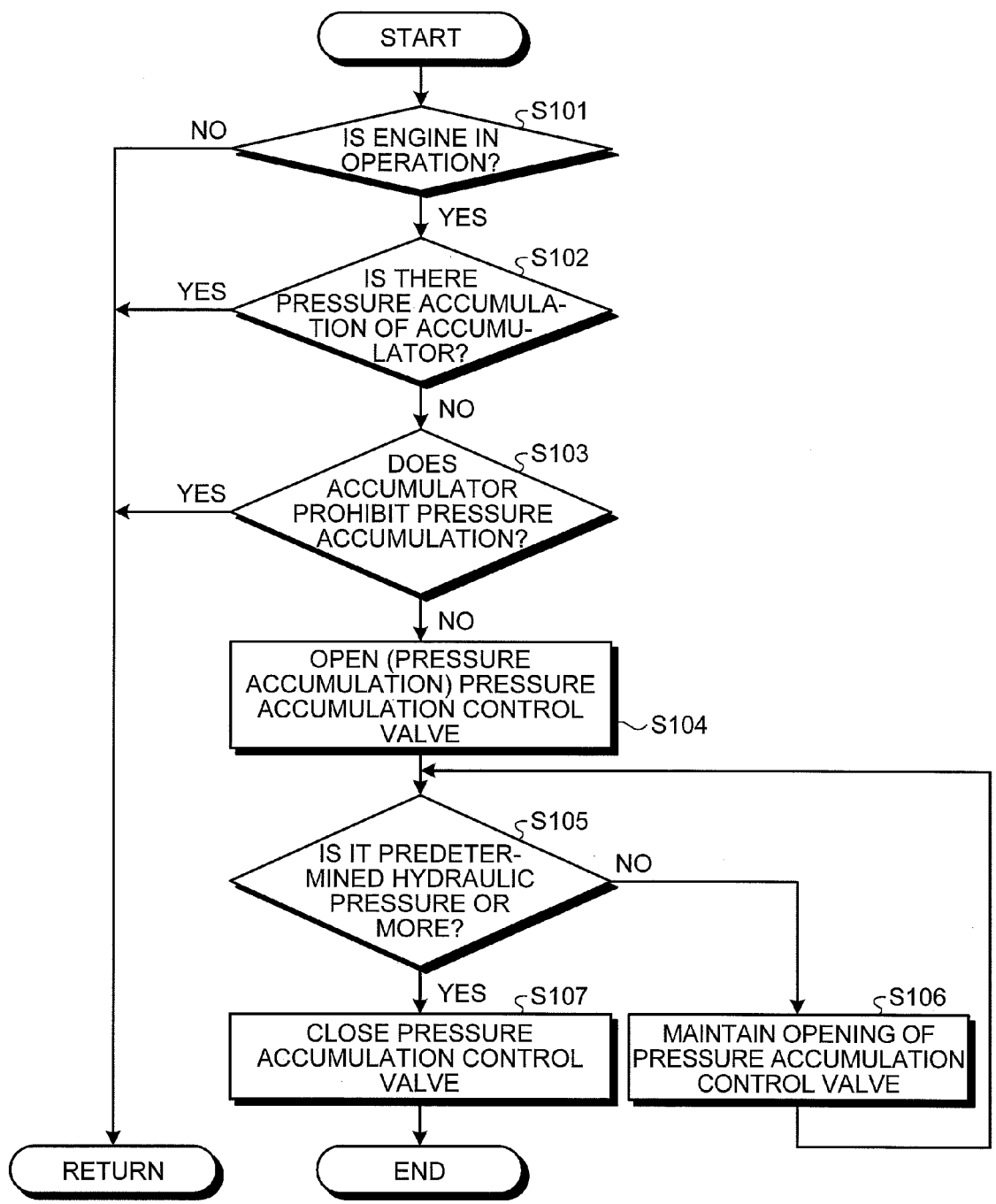
FIG. 3 is a flowchart illustrating a pressure accumulation process of an accumulator performed by the hydraulic control device of the present embodiment.
Figure 4:
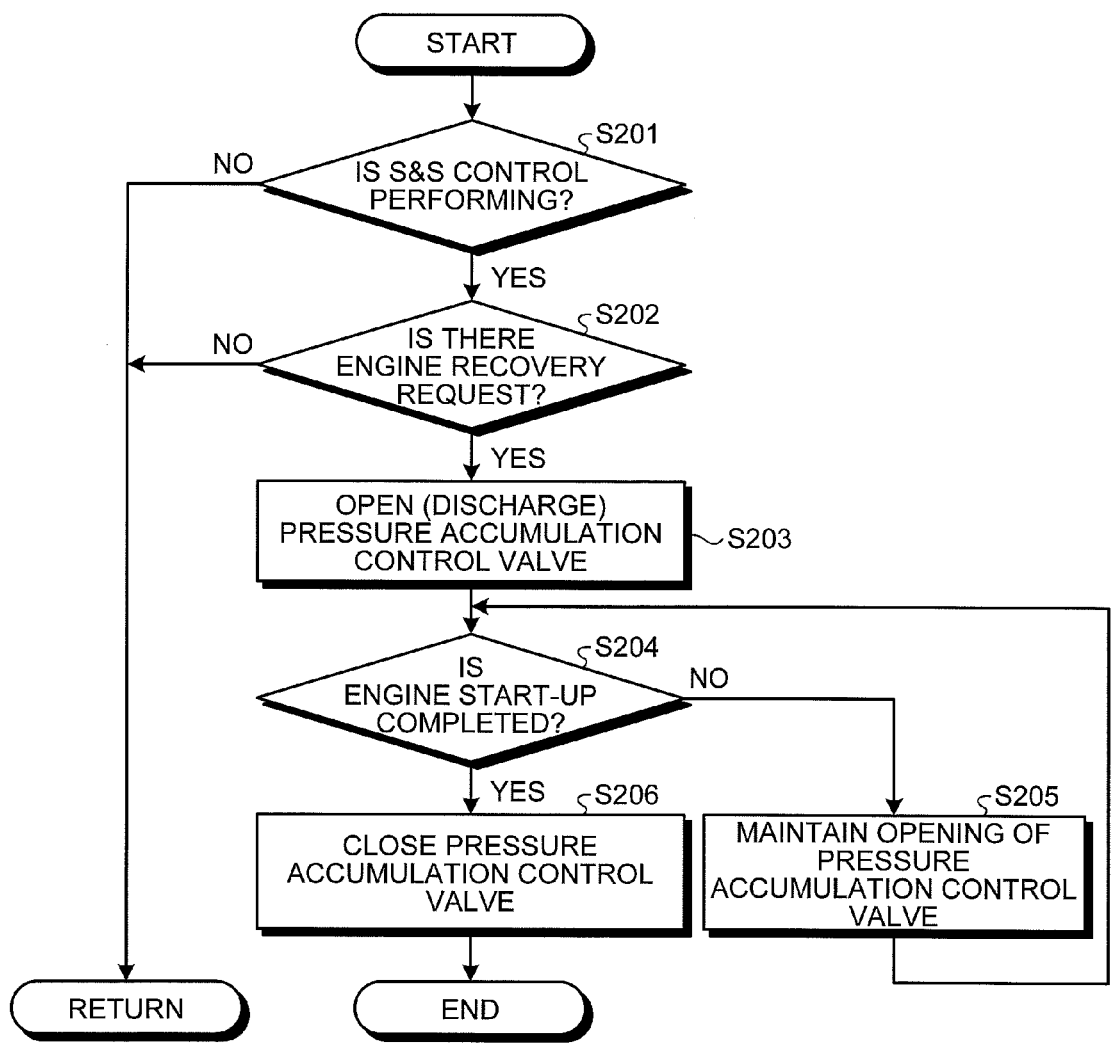
FIG. 4 is a flowchart illustrating a discharge process of the accumulator performed by the hydraulic control device of the embodiment.
Figure 5:
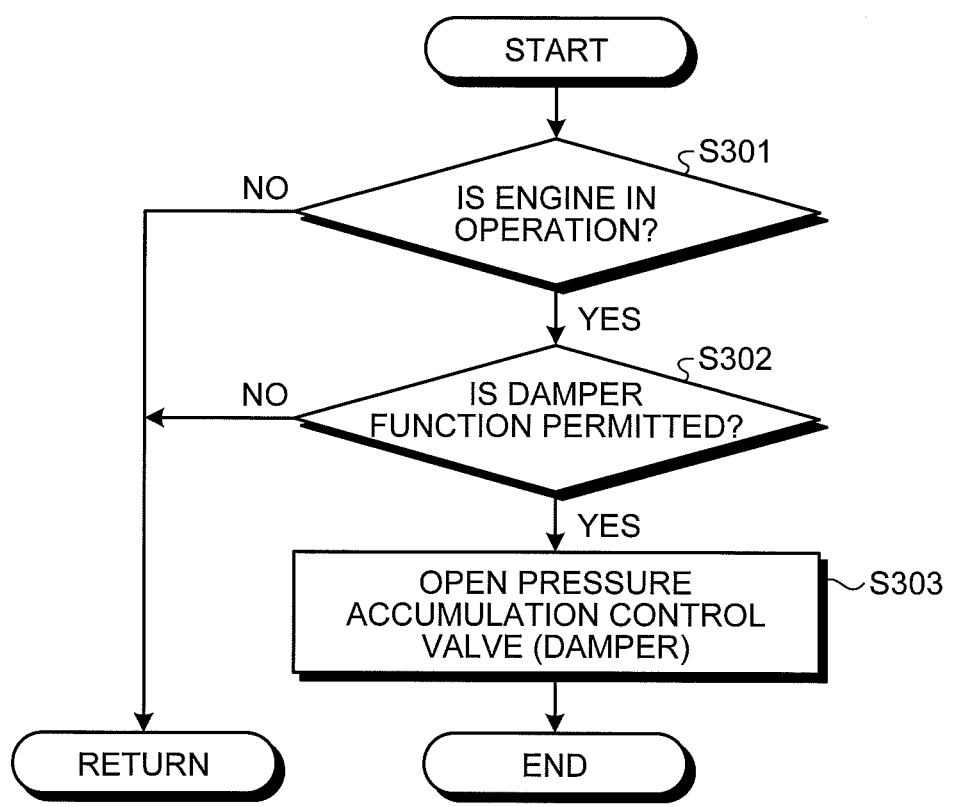
FIG. 5 is a flowchart illustrating a process in which the accumulator performed by the hydraulic control device of the embodiment is used as a damper.

Next, the operation of the hydraulic control device according to this embodiment will be described with reference to FIGS. 3 to 5. FIG. 3 is a flowchart illustrating a pressure accumulation process of the accumulator 42 performed by the hydraulic control device 1 of this embodiment, FIG. 4 is a flowchart illustrating the discharge process of the accumulator 42 performed by the hydraulic control device 1 of this embodiment, and FIG. 5 is a flowchart illustrating a process that uses the accumulator 42 performed by the hydraulic control device 1 of this embodiment as a damper. Each process illustrated in FIGS. 3 to 5 is performed by the ECU 7 using the pressure accumulation control valve 43 of the hydraulic control device 1, various types of sensor information of the vehicle 2 or the like.

First, a pressure accumulation process of the accumulator 42 in the hydraulic control device 1 according to this embodiment will be described with reference first to FIG. 3. The process is performed during non-execution of the idling stop control, in other words, while normal traveling of the vehicle 2. The term "while normal traveling" means a state in which the engine 3 is driven and the mechanical pump 31 is in operation. Furthermore, in an initial state of the process, the pressure accumulation control valve 43 is closed.

First, in step S101, it is checked whether the engine 3 is in operation. When the engine 3 is in operation, the process proceeds to step S102. When the engine 3 is stopped, the process returns to step S101.

In step S101, when it is determined that the engine 3 is in operation, thereafter, in step S102, it is checked whether the accumulator 42 is already accumulated. When there is no pressure accumulation in the accumulator 42, the process proceeds to step S103. When there is a pressure accumulation in the accumulator 42, the process returns to step S101.

In step S102, when it is determined that there is no pressure accumulation in the accumulator 42, inhibition conditions of the pressure accumulation process of the accumulator 42 are satisfied, and, in step S103, it is checked whether the pressure accumulation is being inhibited. Here, the inhibition conditions of the pressure accumulation process can include, for example, a case in which the clutch pressure Pc1 is controlled by the SLC linear solenoid 40 and a quick response is required for control of the C1 control system 18, such as a state in which the control of releasing the forward-reverse switching clutch C1 is performed or a state in which the vehicle returns from the idling stop traveling and the control of engaging the forward-reverse switching clutch C1 is performed, just before the transition to idling stop traveling. Furthermore, the inhibition conditions can include a case in which the consumption flow rate of the hydraulic route 33 (valve body), such as a state of low engine speed, a state of high oil temperature in the hydraulic control device 1, and a state of high transmission speed.

In step S103, when the pressure accumulation is being inhibited, the pressure accumulation control valve 43 remains closed, and the process returns to step S101. Meanwhile, when the pressure accumulation is not being inhibited, the pressure accumulation control valve 43 is opened in step S104. Thus, oil is introduced into the accumulator 42 from the clutch oil passage 38, and the pressure accumulation in the accumulator 42 is performed. In addition, since the engine 3 is in operation at this time, the line pressure PL is generated. Accordingly, the switching valve 48 is switched to communicate with the second oil passage 47, and the accumulator 42 introduces oil from the clutch oil passage 38 of the downstream side of the manual valve 41 via the second oil passage 47.

Next, in step S105, it is checked whether the accumulator pressure Pacc is a predetermined hydraulic pressure or more. When the accumulator pressure is the predetermined hydraulic pressure or more, as the pressure accumulation of the accumulator 42 is sufficiently performed, the pressure accumulation control valve 43 is closed in step S107, and the process is finished. Meanwhile, when a predetermined hydraulic pressure is not obtained, opening of the pressure accumulation control valve 43 is maintained in step S106, and the process directly returns to step S105.

Next, the discharge process of the accumulator 42 in the hydraulic control device 1 according to this embodiment will be described with reference to FIG. 4. This process is performed during execution of the idling stop control. Furthermore, as a premise of the process of FIG. 4, it is assumed that the pressure accumulation process illustrated in FIG. 3 is already executed and the pressure accumulation control valve 43 is closed at the accumulator pressure Pacc of a predetermined level or more.

First, in step S201, it is checked whether the S&S control (idling stop control) is being executed. When the S&S control is being executed, the process proceeds to step S202. When the S&S control is not executed, the process returns to step S201.

Next, in step S202, it is checked whether there is an engine recovery request. The engine recovery request is a command for returning the engine to the engine traveling from the idling stop traveling, and, for example, states in which the brake is turned off, the negative pressure of the brake is lowered, or the battery voltage is lowered, are detected as a trigger.

When there is no engine recovery request in step S202, pressure of the oil in the accumulator 42 is maintained while closing the pressure accumulation control valve 43, and the process returns to step S201.

Meanwhile, when there is an engine recovery request in step S202, until the engagement control of the forward-reverse switching clutch C1 is performed after restart of the engine 3, as there is a need to raise the clutch pressure Pc1 to the packing pressure, the pressure accumulation control valve 43 is opened in step S203, and the restart control of the engine 3 is started by giving an engine start-up request to the starter along with this. At this time, since the engine 3 is stopped, the line pressure PL is not generated. Accordingly, the switching valve 48 is switched to communicate with the first oil passage 46. Therefore, the accumulator 42 discharges oil to the clutch oil passage 38 on the upstream side of the SLC linear solenoid 40 via the first oil passage 46. Thus, it is possible to increase the hydraulic pressure Plpm2 as an original pressure of the clutch pressure Pc1 controlled by the SLC linear solenoid 40, and the packing pressure (approximately, 0.1 MPa) can be generated by increasing the clutch pressure Pc1.

Next, in step S204, it is checked whether the engine start-up is completed. When the engine start-up is not completed, the process returns to step S204 while maintaining the opening of the pressure accumulation control valve 43 in step S205. Meanwhile, when the engine start-up is completed, in order to improve the control responsiveness of the clutch pressure Pc1 by the SLC linear solenoid 40, the pressure accumulation control valve 43 is closed in step S206 to prevent oil supplied from the mechanical pump 31 from flowing into the accumulator 42 from the hydraulic route 33.

Next, a process of utilizing the accumulator 42 in the hydraulic control device 1 according to this embodiment as a damper function will be described with reference to FIG. 5. This process is performed while normal traveling of the vehicle 2 (a state in which the vehicle is traveling or stopped and the engine is operated).

First, in step S301, it is checked whether the engine 3 is in operation. When the engine 3 is in operation, the process proceeds to step S302. When the engine 3 is stopped, the process returns to step before S301.

When it is determined that the engine is in operation in step S301, in step S302, it is checked whether the utilization of the accumulator 42 as a damper function is permitted. Here, a situation in which it is desired to utilize the accumulator 42 as a damper function may be a situation in which a transition operation of the shift position from D (drive) to other gear positions such as R (reverse), N (neutral), and P (parking) occurs, for example, when the vehicle 2 is parked or stopped. When there is such a shift operation, since the manual valve 41 is displaced depending on the shift operation, the clutch pressure Pc1 varies.

As conditions (damper function permission conditions) for determining occurrence of such a situation, for example, it is possible to set the detection of a situation in which the vehicle speed becomes 0 or a situation in which the shift operation is actually performed. Moreover, when the damper function permission conditions are satisfied, it is possible to determine that the utilization of the accumulator 42 as a damper function is permitted.

When it is determined that the damper function is not permitted in step S302, the process returns to step S301.

When it is determined that the damper function is permitted in step S302, the pressure accumulation control valve 43 is opened in step S303. At this time, since the engine 3 is in operation and the line pressure PL occurs, the switching valve 48 is switched to communicate with the second oil passage 47, the accumulator 42 communicates with the clutch oil passage 38 of the downstream side of the manual valve 41 via the second oil passage 47. Moreover, in this state, when the shift operation is performed, the manual valve 41 is displaced, and the clutch pressure Pc1 as the hydraulic pressure supplied to the C1 control system 18 varies, since the varied pressure is introduced into the accumulator 42 through the second oil passage 47, the variation of the clutch pressure Pc1 is suppressed.

Next, effects of the hydraulic control device 1 according to this embodiment will be described.

The hydraulic control device 1 of this embodiment is provided with the mechanical pump 31 configured to discharge oil by driving of the engine 3, the hydraulic route 33 (clutch oil passage 38) configured to supply oil discharged by the mechanical pump 31 to the C1 control system 18, the SLC linear solenoid 40 provided on the hydraulic route 33 to control the clutch pressure Pc1 as an oil pressure supplied to the C1 control system 18, and the manual valve 41 provided on the downstream of the SLC linear solenoid 40 of the hydraulic route 33 to switch the hydraulic pressure supply to the C1 control system 18 depending on the shift operation of the vehicle 2. The hydraulic control device 1 is provided with the accumulator 42 configured to accumulate oil supplied by the mechanical pump 31 and supplies the accumulated oil to the C1 control system 18 by discharging the accumulated oil, the first oil passage 46 connected to the hydraulic route 33

(the clutch oil passage 38) on the upstream side of the SLC linear solenoid 40, the second oil passage 47 connected to the hydraulic route 33 on the downstream side of the manual valve 41, and connection control means (the switching valve 48 and the pressure accumulation control valve 43) configured to control the connection between the accumulator 42 and the hydraulic route 33 so as to allow the accumulator 42 to communicate with one of the first oil passage 46 and the second oil passage 47.

With this configuration, it is possible to connect the accumulator 42 to the hydraulic route 33 (clutch oil passage 38) via one of the first oil passage 46 or the second oil passage 47. In a state in which the accumulator 42 communicates with the second oil passage 47, the accumulator 42 is connected to the hydraulic route 33 (the clutch oil passage 38) on the upstream side of the SLC linear solenoid 40. If the oil accumulated in the accumulator 42 is discharged in this state, it is possible to increase the original pressure Plpm2 of the clutch pressure Pc1 generated by the SLC linear solenoid 40, and to control the clutch pressure Pc1 to the packing pressure. That is, in this state, at the time of restart of the engine when returning from the idling stop control, it is possible to effectively utilize the accumulator 42 as the pressure accumulation/discharge function for ensuring the packing pressure supplied to the C1 control system 18.

Meanwhile, in the state in which the accumulator 42 is in communication with the first oil passage 46, the accumulator 42 is connected to the hydraulic route 33 (the clutch oil passage 38) on the downstream side of the manual valve 41. If the accumulator 42 communicates with the clutch oil passage 38 in this state, since the oil can be introduced into the accumulator 42 from the clutch oil passage 38, it is possible to absorb the variation of the clutch pressure Pc1 due to the movement of the manual valve 41. That is, in this state, it is possible to effectively use the accumulator 42 as a damper function of reducing the shock (D-N shock) during engagement of the C1 control system 18 associated with the shift operation.

In this way, depending on whether the accumulator 42 is connected to the hydraulic route 33 via one of the first oil passage 46 or the second oil passage 47, it is possible to properly use a single accumulator 42 as both of a function (pressure accumulation/discharge function) for supplying the hydraulic pressure to the C1 control system 18 at the time of engine restart, and a function (damper function) for reducing the engagement shock of the C1 control system 18. As a result, there is no need to install a plurality of accumulators to achieve the plurality of functions, and it is possible to realize the plurality of functions by a simple configuration of only a single accumulator.

Furthermore, in the hydraulic control device 1 of this embodiment, the connection control means includes the switching valve 48 which switches the accumulator 42 to communicate with the hydraulic route 33 (the clutch oil passage 38) via the first oil passage 46 during stop of the engine 3, and switches the accumulator 42 to communicate with the hydraulic route 33 (the clutch oil passage 38) via the second oil passage 47 during operation of the engine 3, and the pressure accumulation control valve 43 that is disposed between the switching valve 48 and the accumulator 42 to control the pressure accumulation and the discharge of the accumulator 42.

With this configuration, the switching valve 48 is switched depending on the operating conditions of the engine 3, at the time of normal traveling at which the engine 3 is operated, the accumulator 42 communicates with the second oil passage 47 by the switching valve 48, and at the time of idling stop traveling at which the engine 3 is stopped, the accumulator 42 communicates with the first oil passage 46 by the switching valve 48. Thus, it is possible to switch the single accumulator 42 so as to be able to perform the proper functions of the pressure accumulation, the discharge, and the damper depending on the operating states of the engine 3. Furthermore, since the switching valve 48 can be switched according to whether there is the line pressure PL, and there is no need for electrical control, it is not necessary to prepare a control system, and the cost reduction is achieved.

In addition, the switching valve 48 switches the communication between the first oil passage 46 and the second oil passage 47 using the line pressure PL as the operating pressure in this embodiment, but as long as the communication can be switched depending on driving/stop of the engine 3, those other than the line pressure may be used as the operating pressure.

Next, a modified example of this embodiment will be described with reference to FIG. 6. In the above-described embodiments, the switching valve 48 and the pressure accumulation control valve 43 were used as the connection control means configured to control the connection between the accumulator 42 and the hydraulic route 33, these valves can be replaced with a pressure accumulation control valve 43a and a damper control valve 50.

Figure 6:
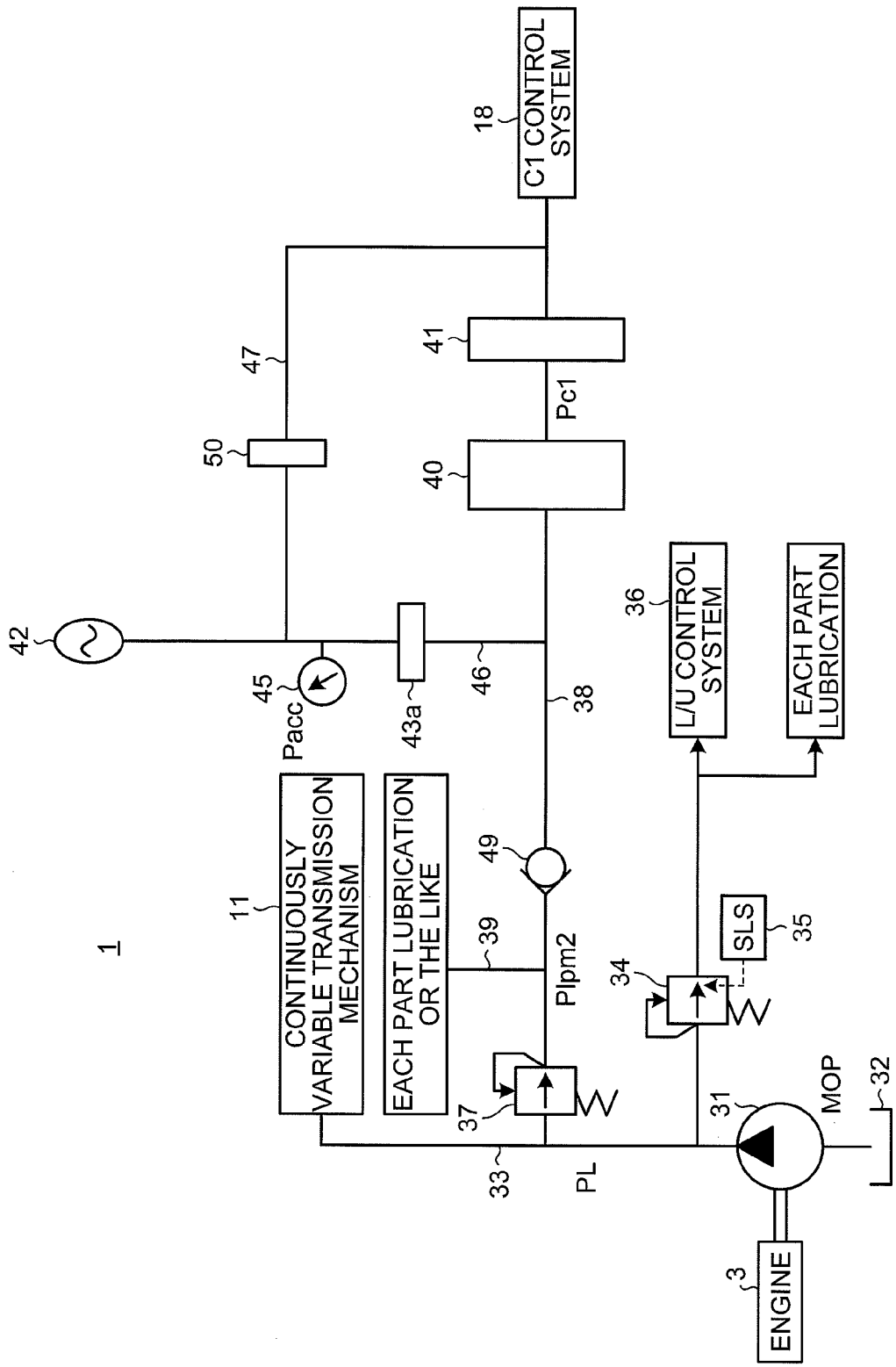
FIG. 6 is a diagram illustrating a modified example of the hydraulic control device of this embodiment.

As illustrated in FIG. 6, the pressure accumulation control valve 43a is provided on the first oil passage 46. In the same manner as in the pressure accumulation control valve 43 of the above-described embodiment, the pressure accumulation control valve 43a is configured so as to be able to control the pressure accumulation process and the discharge process of the accumulator 42. The damper control valve 50 is provided on the second oil passage 47.

In this modified example, at the time of normal traveling of the vehicle, when the pressure accumulation control valve 43a is opened in the closed state of the damper control valve 50, the oil flowing in the clutch oil passage 38 is introduced into the accumulator 42 from the first oil passage 46, and thus it is possible to perform the pressure accumulation process of the accumulator 42. Furthermore, during execution of the idling stop control, when opening the pressure accumulation control valve 43a in the closed state of the damper control valve 50, it is possible to discharge oil accumulated in the accumulator 42 to the clutch oil passage 38 from the first oil passage 46.

Furthermore, when predetermined damper function permission conditions are satisfied while normal traveling of the vehicle, when opening the damper control valve 50 in the closed state of the pressure accumulation control valve 43a, the oil of the clutch pressure Pc1 is introduced into the accumulator 42 from the second oil passage 47, and thus, it is possible to use the accumulator 42 as the damper function of suppressing the variation of the clutch pressure Pc1. In addition, in the configuration of this modified example, when performing the process of using the accumulator 42 illustrated in FIG. 5 as the damper function, the process of step S303 is referred to as a "damper control valve 50 open".

The preferred embodiments of the present invention have been described and illustrated above, but the present invention is not intended to be limited to these embodiments. The present invention may be formed by combining a plurality of embodiments described above, and the respective components of the embodiments can be changed to those capable of being easily replaced by persons skilled in the art or substantially the same components.

In the above-described embodiments, although the description has been given of a case in which the belt type continuously variable transmission mechanism 11 is applied as an example of the transmission, the transmission may use for example, a manual transmission (MT), a stepped automatic transmission shifting device (AT), a continuously variable automatic transmission of a toroidal type (CVT), a multi-mode manual transmission (MMT), a sequential manual transmission (SMT), a dual clutch transmission (DCT) or the like.

Furthermore, in the above-described embodiments, although the C1 clutch (the forward-reverse switching clutch C1 and the forward-reverse switching brake B1) of the forward-reverse switching mechanism 10 has been exemplified as the clutch hydraulically controlled by the hydraulic control device 1, as long as the clutch is able to shut off the rotational torque between the engine and the driving wheel side as an open state during idling stop control, and to transmit the rotational torque of the driving wheel side as an engaged state, it is also possible to use clutches other than the C1 clutch of the forward-reverse switching mechanism 10.

REFERENCE SIGNS LIST

1 HYDRAULIC CONTROL DEVICE
3 ENGINE
31 MECHANICAL PUMP
33 HYDRAULIC ROUTE
18 C1 CONTROL SYSTEM (CLUTCH)
40 SLC LINEAR SOLENOID (CLUTCH PRESSURE CONTROL VALVE)
41 MANUAL VALVE
42 ACCUMULATOR
43, 43a PRESSURE ACCUMULATION CONTROL VALVE (CONNECTION CONTROL MEANS)
46 FIRST OIL PASSAGE
47 SECOND OIL PASSAGE
48 SWITCHING VALVE (CONNECTION CONTROL MEANS)

The invention claimed is:

1. A hydraulic control device of a vehicle comprising:
   a mechanical pump configured to discharge oil by driving of an engine,
   a hydraulic route configured to supply the oil discharged by the mechanical pump to a clutch,
   a clutch pressure control valve provided on the hydraulic route and configured to control a clutch pressure serving as a hydraulic pressure supplied to the clutch, and
   a manual valve provided on a downstream side of the clutch pressure control valve of the hydraulic route and configured to switch a hydraulic pressure supply to the clutch depending on a shift operation of the vehicle, the hydraulic control device comprising:
   an accumulator configured to accumulate the oil supplied by the mechanical pump and supply the accumulated oil to the clutch by discharging the accumulated oil;
   a first oil passage, connected to the hydraulic route and the accumulator, is on an upstream side of the clutch pressure control valve;
   a second oil passage, connected to the hydraulic route and the accumulator, is on a downstream side of the manual valve; and
   a connection control unit configured to control the connection between the accumulator and the hydraulic route so that the accumulator is in communication with one of the first oil passage and the second oil passage.

2. The hydraulic control device according to claim 1, wherein
   the connection control unit includes
   a switching valve configured to switch so that the accumulator is in communication with the hydraulic route via the first oil passage during stop of the engine, and to switch so that the accumulator is in communication with the hydraulic route via the second oil passage during operation of the engine, and
   a pressure accumulation control valve disposed between the switching valve and the accumulator and configured to control the pressure accumulation and discharge of the accumulator.

* * * * *